United States Patent [19]

Trajtenberg et al.

[11] 4,181,202
[45] Jan. 1, 1980

[54] RAILWAY BRAKE SHOE WITH REMOVABLE FLANGE

[76] Inventors: Aaron Trajtenberg; Ana M. Ghibaudi, both of Sarmiento 552, piso 12°, Buenos Aires, Argentina

[21] Appl. No.: 895,058

[22] Filed: Apr. 10, 1978

[51] Int. Cl.² ............................................. F16D 69/04
[52] U.S. Cl. ..................................... 188/252; 188/243
[58] Field of Search ......................... 188/252, 253, 243

[56] References Cited

U.S. PATENT DOCUMENTS 4,020,928  5/1977  Beetle .................................. 188/243

Primary Examiner—George E. A. Halvosa
Attorney, Agent, or Firm—Norris and Bateman

[57] ABSTRACT

In a railway wheel braking unit, a braking flange carrying a friction pad for engaging the wheel tread is detachably mounted on the main brake shoe by a rod structure that projects with a snug fit into an arch on the main shoe, a retaining pin passing through aligned openings in the arch side walls and the rod structure.

3 Claims, 6 Drawing Figures

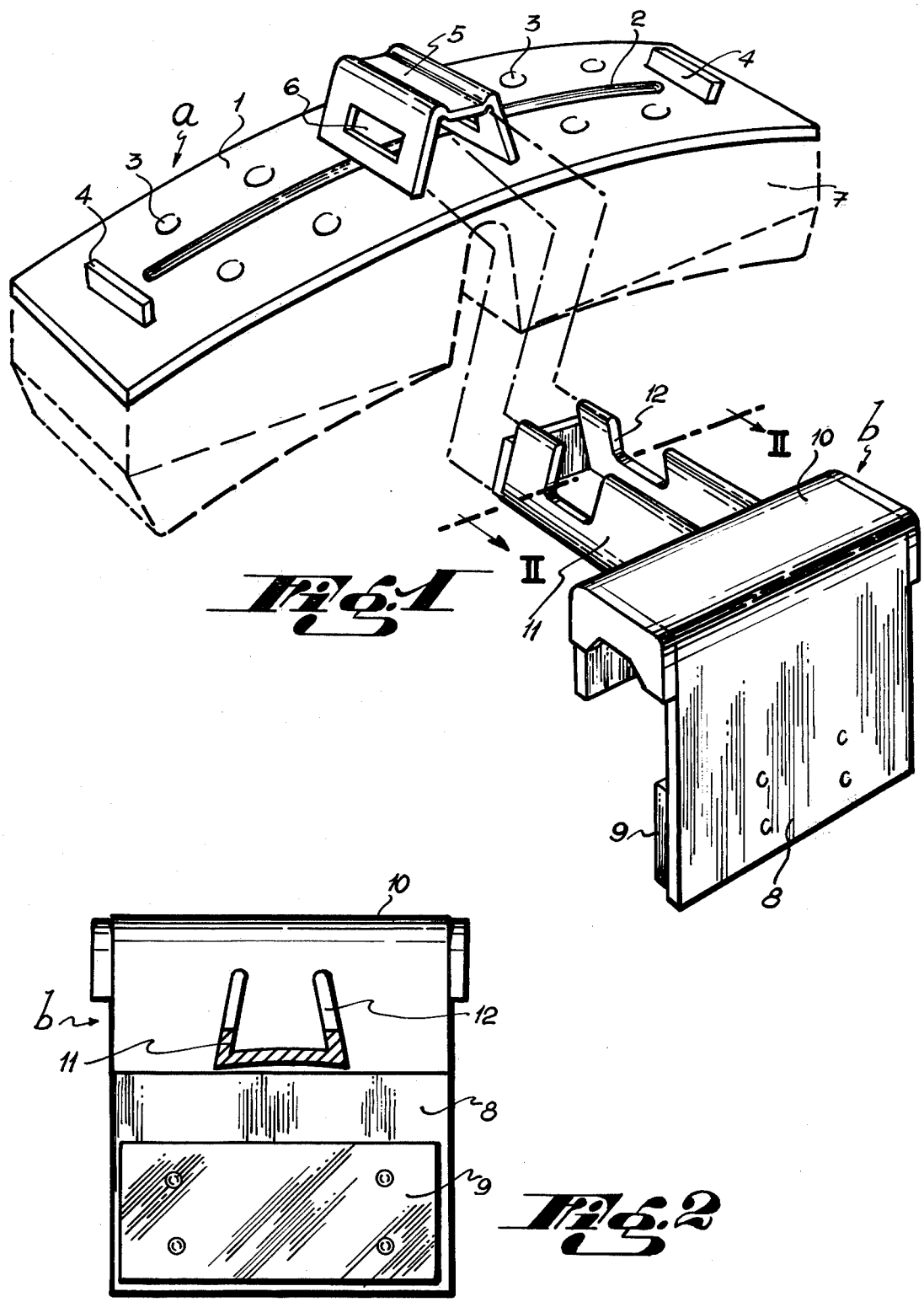

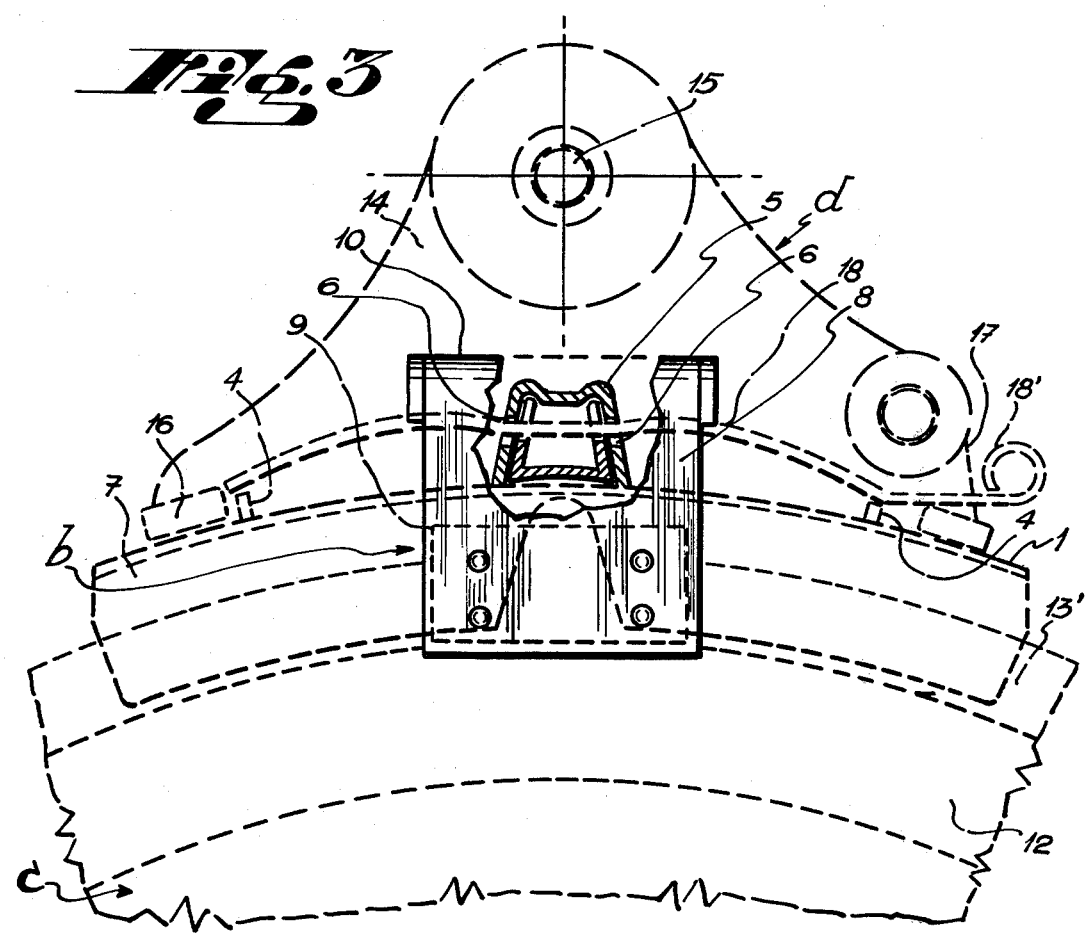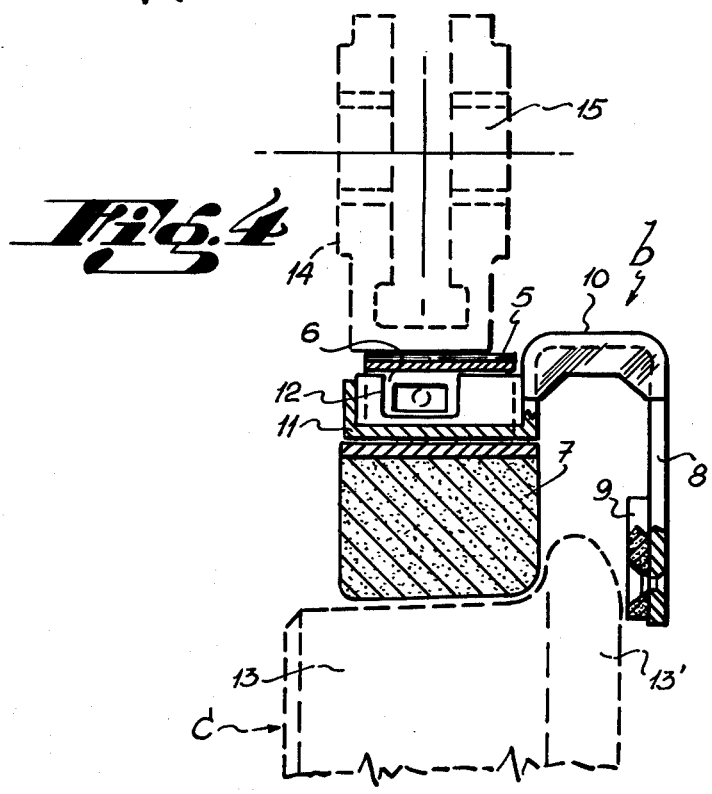

RAILWAY BRAKE SHOE WITH REMOVABLE FLANGE

BACKGROUND OF THE INVENTION

This invention refers generally to railway brake systems and more particularly it refers to a brake unit for railway wheels. Its object is to provide a very effective means for the accomplishment of its specific functions, having particular constructive and operative characteristics.

There are known brake shoes for railway wheels, particularly those made of cast iron, comprising the cast iron braking block or shoe proper, mounting devices and a rib adapted to tie the operating support to the associated wheel.

There are also known the so called "flange" shoes having a side extension to grip the zone corresponding to the wheel flange that retains the railway wheels in relation with the associated rails.

The modern manufacturing systems to produce braking blocks made of moulded or vulcanized or the like materials, show a number of advantages such as an improved braking efficiency with less noise, greater friction coefficient, higher abrasion resistance, easier molding etc.

However these advantages are partially masked by certain disadvantages such as the requirement for uniform thicknesses. In fact, when a braking assembly is heat treated, part of the block (having the less section) is burned, while the thickest section keeps raw, so that it totally lacks its operating efficiency.

The problems of the synthetic brake are aggravated in the case of the shoes with a "flange" part. The latter part, in fact, has a substantially smaller section than the main shoe block part so that when submitted to the same vulcanization time as the flange part, it will be burned while the main shoe block part will remain raw when the vulcanization time adapted for the flange part is used.

This is the reason why up the present time the production of the flange shoes has been limited to the cast iron or similar types.

This invention provides a solution to the above mentioned problems providing a particular form of the flange braking shoe characterized by comprising two mutually coupled parts.

One of said parts is the shoe proper, having a support adapted to receive a flange supporting member, said support and supporting member being mutually separable.

The above mentioned design enables the independent manufacture of the main braking blocks and the flange operating blocks, the manufacture of one of each part not being influenced by the manufacture of the other part on account of such independent production process.

A further advantage of this invention is to manufacture the main shoes apart from the flange shoes but including means for the mutual coupling of both parts. The braking assembly so combined operates as an undivided one piece assembly.

A further advantage of the invention is the easy disconnection of the flange shoe from the main shoe, which is effected by the simple removal of an appropiate pin, so that a worn out flange shoe may be easily replaced by a new one.

Another advantage of the invention is the simplification in the manufacture of brake shoe assemblies having a flange part with the possibility of using both the main alone or combined with the flange shoe.

Another advantage of the invention is to provide an easy coupling of the flange assembly to the shoe support and its consequent uncoupling; through an elastic and flexible rod passing through suitable openings defining variable retaining curved shapes.

Other advantages of this invention will be apparent from the following detailed specification.

THE MAIN OBJECT OF THIS INVENTION

To attain the above objects and advantages, the braking system for railway wheels is of the type wherein the wheel having the ring shaped flange for retention on the rail is provided in front of its thread with a braking shoe which is provided with a mounting assembly including a central arc anchoring said to a supporting structure, which is operable by command means against the wheel rim.

Said braking assembly, characterized in that the central anchoring arc is shaped as a cavity that leads to the sides of the shoe and in that said cavity receives the rod of a braking flange that is removably adapted therein.

Shaping both the said rod of the braking shoe and the arc receiving the same, there are respective coincident apertures adapted to receive a retaining pin that passes though said apertures.

Said retaining pin being made as an elongated elastic pin, it is submitted within said apertures to a variably shaped distorsion.

DESCRIPTION OF THE DRAWINGS

The above mentioned and other features and objects of this invention and the manner of attaining them, will become more apparent and the invention itself will be better understood by reference to the following drawings, made by way of example and not as a limitation of the invention itself, of a preferred embodiment of the invention.

FIG. 1 is an exploded perspective view of the braking shoe and the flange assembly, showing the way in which they are mutually coupled while at the same time they enable an independent disassembly.

FIG. 2 is a cross section of the rod of the flange, following the plane II—II of FIG. 1, showing a cross section of said rod as well as the arrangement of the braking rod at the flange's inner face.

FIG. 3 is a schematic view of the braking unit, with both parts mutually coupled by means of the retaining pin (shown in broken lines as the rest of the elements) with a part section of the anchoring and mutual coupling supports, as well as the flange, giving a clear idea of the manner in which the coupling takes place and the respective retention by the variable distorsion of the curvature of the retaining pin; and, FIG. 4 is a cross section of the braking unit when coupled as in FIG. 3 above, to give a clear idea of its general design and the arrangement of its various component parts. It shows in broken lines the supporting member and a part of the railway wheel to which the braking unit proper is applied.

In the different figures, the same reference numbers are used to characterized the same or like parts, the grouping of various elements being characterized by letters.

Figure 5:
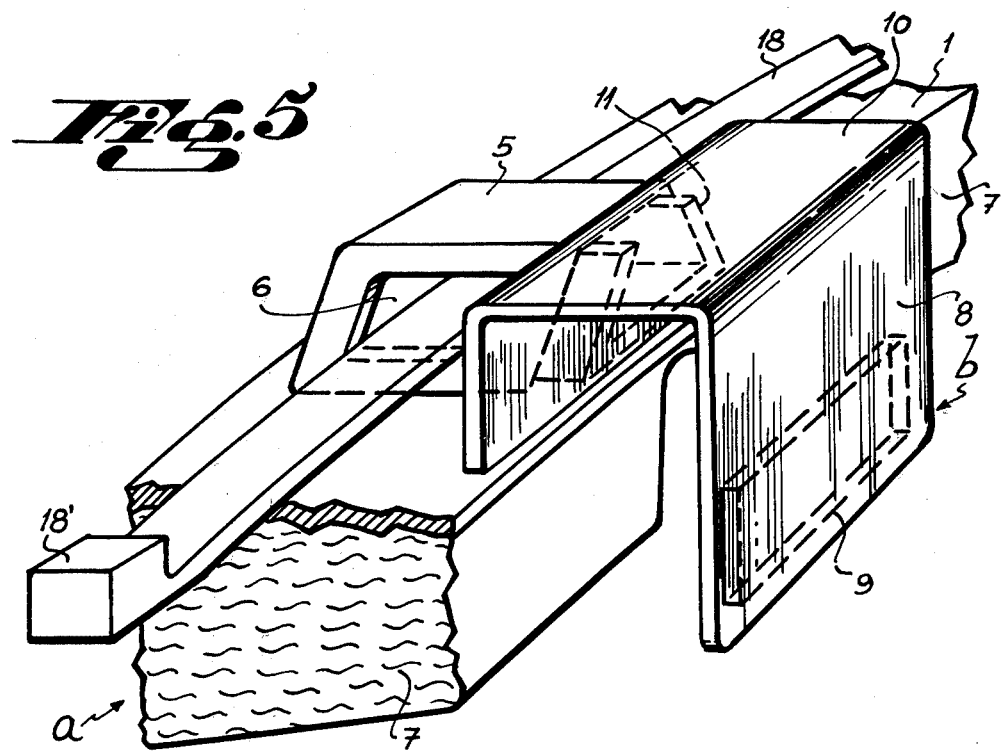
FIG. 5 is a generally perspective view partly in section showing the retaining pin in position.
Figure 6:
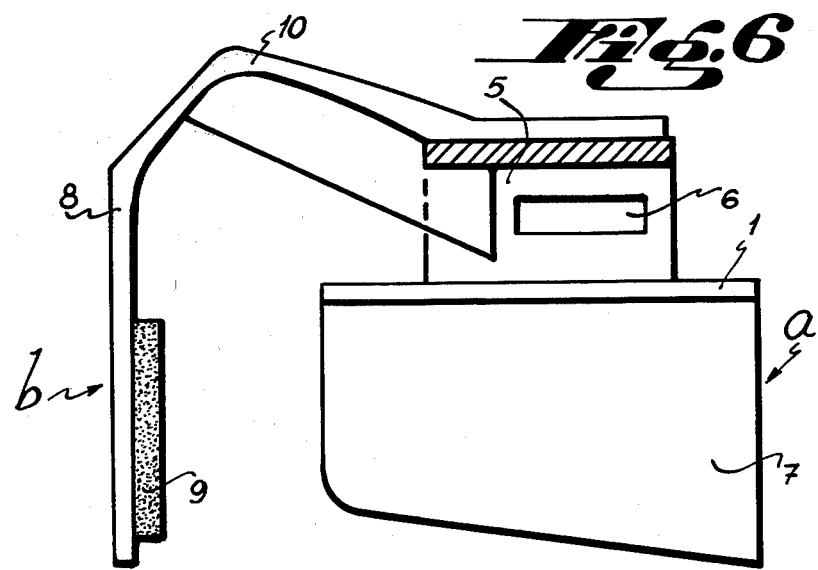
FIG. 6 is a section through the braking flange.

The following references have been used:
- a—braking shoe
- b—braking flange
- c—wheel
- d—supporting structure
- 1—mounting of a
- 2—lengthwise rib of 1
- 3—openings in 1
- 4—transverse stops in 1
- 5—central anchorage arc in 1
- 6—side openings in 5
- 7—braking block in shoe a
- 8—flange of b major branch of the reversed "U"
- 9—braking shoe in 8
- 10—central section of the reversed "U" in b
- 11—rod in b
- 12—notches in 11
- 13—rim of wheel c
- 13': ring shaped tooth or flange on 13
- 14—support
- 15—fulcrum for 14
- 16—rests of 14 in 1
- 17—entrance for the cavity in 14
- 18—passing-through retention pin for coupling
- 18'—gripping terminal on 18

SPECIFICATION

Generally speaking, the braking unit- a-b when applied to a railway wheel c (comprised, as it is well known, of a tread or rim 13 and an encircling ring shaped tooth for retaining the wheel on the rail) includes the braking shoe a jointly operating with a complementary braking flange structure b.

More particularly and as shown in the accompanying drawings, the braking unit a-b is mounted on a hollow support d having a support structure 14 which, being articulated at 15 in connection with control means, includes rest blocks 16 resting on the mounting 1 of the braking shoe a and has an aperture 17 for access to its cavity (FIG. 3).

The braking shoe a comprises a braking block made of two parts of synthetic material of high friction coefficient and is provided with a transverse central notch, of such a depth that it nearly reaches the mounting member 1.

This braking shoe or block 7, having an inner curvature approximately equivalent to that of wheel 13 to which it faces, protrudes from a plate 1 forming a mounting member having cuts and apertures 3 enabling an easier anchorage to said mounting member 1 and shaping a lengthwise reinforcing rib 2 having near its ends respective transverse stops 4 (FIGS. 1 and 3).

In the central part of the crest of mounting member 1, it is provided with a transverse arch 5, having upper reinforcing ribs and to facilitate ending at both sides of block 7, it is provided at its side walls with appropriate openings 6 (FIGS. 1, 3 and 4).

On the other hand, the flange structure b comprises a reversed "U" mounting 10 of unequal branches, the grater one, bearing the reference 8, is fixed at its inner face to a braking block 9—(FIGS. 1 and 2) while from the smallest branch projects a rod 11 made of a "U" shaped member, the side walls of which converge to the upper zone (so bounding a trapeze-shaped cavity) both sides having respective notches 12 (FIG. 1).

The convergence of the side walls of the rod 11 is equivalent to the convergence of the cavity shaped by the anchoring arch 5 in the mounting member 1, in which it is snuggly fitted and in such a way that the notches 12 of said rod are kept in coincidence with the apertures 6 of said arch. (FIG. 4). As shown rod 11 is a substantially U-shaped member with its sides converging toward the open end and with notches 12 formed in the upper edges of those sides.

The above described arrangement enables the braking shoe to operate either alone or in combination with flange b.

In the latter case, it will suffice to fit the rod 11 into the cavity of the arch 5 (FIG. 1) as shown in FIGS. 3 and 4).

There is then introduced through the aperture 17 of the cavity of the supporting structure d, a flexible pin 18 going forcibly through the coincident notches and openings 12-14 as it suffers a variable distortion the cavity of the supporting structure d. The flange b is thus retained in its coupling position to the shoe a (FIGS. 3 and 4), thus retaining said shoe in an operative position over the rim 13 while the flange 9 acts upon the tooth 13 of wheel c.

When it is desired to disassemble the flange part b, it suffices to pull from the gripping terminal 18' so that the pin 18 flexes and can be taken out through the coincident passages 6 and 12.

While the principles of the invention have been described above in connection with specific apparatus and applications, it is to be understood that this description is made only by way of example and not as a limitation on the scope of the invention as claimed in the following claims.

We claim:

1. A brake unit for railway wheels of the type having a rim provided at one side with an annular rail engaging tooth or flange, comprising a shoe mounting a brake block adapted for engaging said rim and a support structure for said shoe, an arch have side walls upstanding from said shoe defining a cavity and having aligned side wall openings, a braking flange adapted to be detachably mounted on said shoe and comprising branches of unequal length, friction means on the longer of said branches for engaging the wheel flange or tooth when the brakes are applied, a rod structure having a substantially U-shape with side walls fixed to the shorter of said branches and projecting into said cavity with a snug fit and having aligned openings in its side walls adapted to align with the openings in said arch side walls, and a removable retaining pin extending through all of said aligned openings securing said shoe and braking flange to said support structure and cooperating with said side walls to prevent further insertion and withdrawl of said braking flange relative to said shoe.

2. The brake unit defined in claim 1, wherein said arch and rod are of generally trapezoidal shape.

3. The brake unit defined in claim 1 wherein said rod comprises a member having spaced upstanding sides that fit with the side wall inner surfaces of the arch, and said openings in the rod are upwardly open notches in said upstanding sides.

* * * * *